United States Patent [19]

Birkenstack et al.

[11] 3,950,897
[45] Apr. 20, 1976

[54] MULTI-CHAMBERED FLUID BALANCING APPARATUS

[75] Inventors: Dieter Birkenstack, Braunshardt; Otto Jager, Reinheim-Ueberau, both of Germany

[73] Assignee: Gebr. Hofmann KG, Darmstadt, Germany

[22] Filed: Nov. 12, 1974

[21] Appl. No.: 523,121

[30] Foreign Application Priority Data
Nov. 19, 1973  Germany............................ 2357629

[52] U.S. Cl. .................................. 51/169; 74/573 F
[51] Int. Cl.² .......................................... B25B 41/04
[58] Field of Search ............ 74/573 F, 573; 51/169; 210/363

[56] References Cited
UNITED STATES PATENTS
3,597,882  8/1971  Riddington ...................... 74/573 X
3,812,724  5/1974  Curtz et al. ...................... 74/573 X FOREIGN PATENTS OR APPLICATIONS
711,531  7/1954  United Kingdom.................. 74/573

Primary Examiner—Samuel Scott
Assistant Examiner—F. D. Shoemaker
Attorney, Agent, or Firm—Cushman, Darby & Cushman

[57] ABSTRACT

A balancing apparatus, particularly for a grinding wheel, whereby the wheel has four chambers disposed around its axis of rotation with each chamber connected to one face of the ring shaped container by a slot formed in a circular recess at a different radius so that the wheel can be balancing by injecting cooling fluid or the like into the slots to temporarily add fluid to selected chambers.

8 Claims, 2 Drawing Figures

MULTI-CHAMBERED FLUID BALANCING APPARATUS

The invention relates to a device for compensating the unbalance of a rotating body, especially a grinding wheel, with several chambers arranged around the axis of rotation, which rotate together with the rotor and into which, controlled by a control unit, a balancing fluid may be injected, depending on an arising unbalance.

Devices of the general kind are described in German Patent Specification No. 877,887. Machines provided with rotating parts require balancing. Rapid and economic balancing is especially required for machines such as grinding machines with parts that are subject to wear, as unbalances may occur due to uneven abrasion. Since grinding wheels rotate at high speeds, large unbalances occur even with minor deviations.

With known devices, adjustment of the balancing unit for the compensation for unbalance is effected by means of expensive mechanical systems, using compensating weights, whereby especially the precision adjustment of the compensating weights involves large problems. Also, the known devices are very large as the adjusting units require much space and are not easily accessible.

Great difficulties arise especially with the mounting of the unbalance compensation unit on oblique-puncture grinding machines, on surface grinding machines, or on grinding rolls provided with bearings on both sides.

The aforementioned German Patent Specification No. 877,887 describes a balancing unit for washing and cleaning machines, with which the washing drum features three additional chambers and at the front side of which conveyor rings are arranged with angular distances, eccentrically with respect to the axis of rotation, into which water flows from feed pipes according to the manipulation of the valve.

The disadvantage of this balancing unit lies in the expensive construction of the eccentric conveyor rings, which must be worked very carefully and then attached to the drum. Besides, this unit has no free space in the middle, which is, however, absolutely required for fitting the unit between grinding machine and grinding wheel.

It is the object of the invention to propose a compensating device of the kind mentioned above, which permits rapid compensation for unbalance on rotors with simple constructional means.

This object is achieved according to the invention in that the chambers are accommodated in a ring-shaped container at the front side of which fluid inlets are provided, which are arranged on different radii, each inlet, or all inlets respectively on a certain radius, being assigned to a certain chamber and one fluid feed being provided for each radius.

The ring-shaped container is preferably divided into four chambers. The fluid inlets are simply designed as slots arranged on the individual radii, and the fluid feeds for the individual radii are designed as nozzles. These nozzles are arranged one behind the other or one above the other respectively. In the case of a grinding machine the ring-shaped container may be arranged directly on the grinding wheel base. If a cooling fluid is provided for the operation of a machine, this fluid may be used as balancing fluid which is injected into the respective chamber. During the rotation of the rotor the balancing fluid is injected into the respective chambers through the corresponding fluid inlets. In order that the nozzles at the front side of the ring-shaped container will be well guided, the slots forming the fluid inlets can be provided in circular recesses which correspond to the individual radii.

The fluid is led to the individual nozzles through a distributor block with a corresponding number of valves. The valves are controlled according to the arising unbalances so that the balancing fluid is injected into the respective chamber.

The invention presents the advantage that only one information regarding the amount of unbalance is required for carrying out a compensation for unbalance. This information can be provided by conventional unbalance measuring units. There is no need for a calibration of the amount of unbalance or a phase reference signal.

The invention is now explained in detail, on the basis of the following figures in which.

Figure 1:
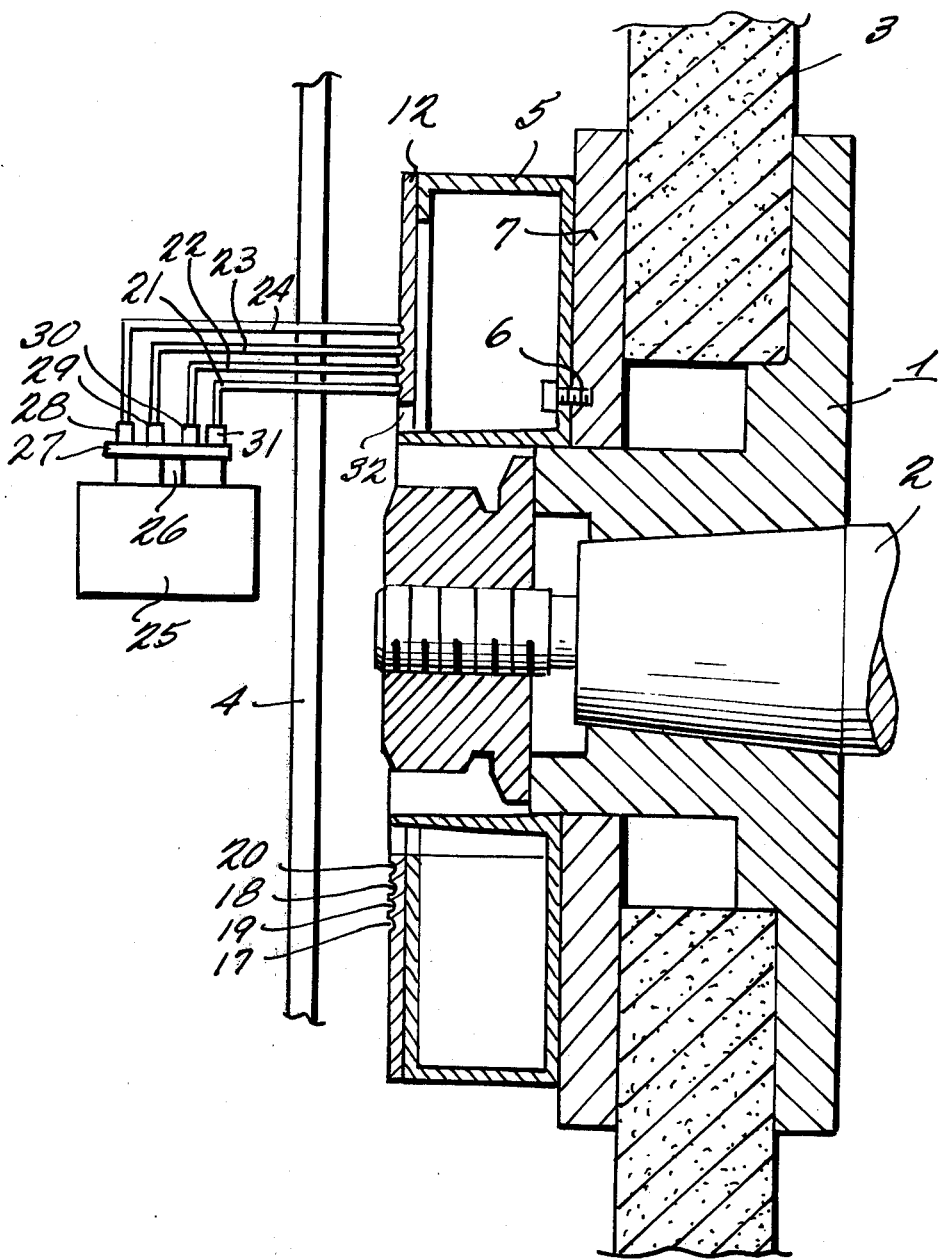
FIG. 1 shows a schematic lateral view of the device.
Figure 2:
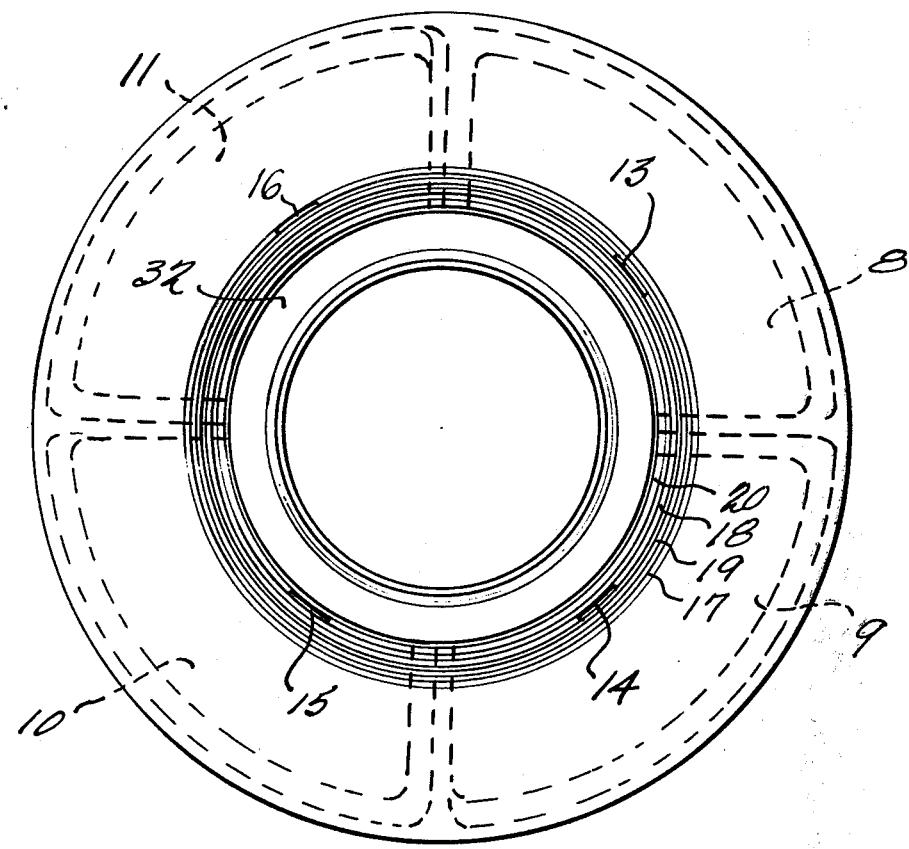
FIG. 2 shows a view of the ring-shaped container.

Referring to FIG. 1, a machine with a rotating body, in our example, a grinding machine 1 with a grinding wheel 3 attached to a spindle 2, is provided with a protective cover generally indicated at 4. A ring-shaped container 5 is fixed with screws on a base 7 of grinding wheel 3. Ring-shaped container 5 has four chambers 8–11; it may be of plate welded together or worked out of one piece and is provided with a cover 12 which forms a free front side. The cover 12 of the ring-shaped container 5, which may be fixed with screws, has four slots 13–16 as fluid inlets, each of them being assigned to one of the chambers 8–11. The slots 13–16 are located on different radii, whereby especially the inner range is chosen in order to obtain a large capacity of the compensating device. One of the concentric circular recesses 17–20 is assigned to each slot in order to achieve a better fluid control and an improved whirling-away conduct. Furthermore, the nozzles 21–24 can thus be approached as far as possible to the slots 13–16 without actually touching cover 12. The nozzles 21–24 are rigidly attached to the protective cover 4 of the grinding machine 1 and are arranged one above the other. Each nozzle is assigned to a slot and thus to a chamber. The balancing fluid flows from a reservoir 25 through a duct 26 to a valve block 27 provided with valves 28–31. These valves are connected with the nozzles 21–24 through ducts.

The ring-shaped container 5 has a circular aperture 32 the function of which is described below.

For each compensation procedure the following program steps are maximally carried out. The procedure is explained with a unit provided with four chambers.

When the measuring electronics indicate an unbalance the valve 28 is, e.g., actuated so that the balancing fluid flows during the rotation from the fluid container 25 through the nozzle 24 and the slot 16 into the chamber 11. In the case of grinding machines or turning lathes for which cooling fluids are used, cooling fluid may also be taken as balancing agent so that the fluid splashing past the slots does not cause any problems. If now the indication of unbalance of the measuring electronics increases, the valve 28 is blocked and the valve 30 opened. In this way the balancing fluid is injected into the chamber 9 arranged opposite. This procedure is carried on until the indication has reached a minimum. Then the valve 29 is actuated and balancing fluid injected into the chamber 10. When the indication increases, the valve 29 is blocked and the valve 31 actuated, i.e., balancing fluid is injected into the opposite-lying chamber 8 until a minimum indication of unbalance has been obtained. In the end the valves 30 and 31 are actuated by turns until the indication of unbalance of the electronics has reached zero or lies within the field of tolerance.

The compensating procedure can, of course, also be carried out manually according to the indication of controlled by a control unit, a balancing fluid may be injected, the improvement wherein the chambers are disposed in a ring-shaped container at one side of which fluid inlets are provided, arranged on different radii, whereby each inlet on a certain radius is assigned to a certain chamber and one fluid feed pipe is provided for each radius.

2. In an apparatus according to claim 1, wherein the fluid inlets are slots and the fluid feed pipes are nozzles so that the balancing fluid can be injected directly into the chambers.

3. In an apparatus according to claim 1, wherein the